United States Patent [19]

Rishavy et al.

[11] 4,014,297

[45] Mar. 29, 1977

[54] ROTARY ENGINE COMBUSTION CONTROL ARRANGEMENT

[75] Inventors: Edward A. Rishavy, Warren; James H. Currie, Rochester, both of Mich.

[73] Assignee: General Motors Corporation, Detroit, Mich.

[22] Filed: May 7, 1975

[21] Appl. No.: 575,211

[52] U.S. Cl. ............................................. 123/8.09
[51] Int. Cl.² ...................................... F02B 53/12
[58] Field of Search ......... 123/8.09, 148 DS, 148 E

[56] References Cited

UNITED STATES PATENTS

| | | | |
|---|---|---|---|
| 3,534,717 | 10/1970 | Froede | 123/148 DS X |
| 3,683,868 | 8/1972 | Panhard | 123/8.09 X |
| 3,831,562 | 8/1974 | Paxton et al. | 123/8.09 |
| 3,945,362 | 3/1976 | Neumann et al. | 123/148 E |

FOREIGN PATENTS OR APPLICATIONS

| | | | |
|---|---|---|---|
| 1,805,042 | 5/1970 | Germany | 123/8.09 |

*Primary Examiner*—Carlton R. Croyle
*Assistant Examiner*—Michael Koczo, Jr.
*Attorney, Agent, or Firm*—Ronald L. Phillips

[57] ABSTRACT

An internal combustion rotary engine is disclosed having leading and trailing spark plugs with their respective spark electrodes arranged in peripherally spaced ignition openings in the inner peripheral wall of the engine's rotor housing. The leading ignition opening is located in a zone where the leading apex seal of the passing chambers experiences a relatively low pressure differential which decreases in the direction of rotor rotation whereas the trailing ignition opening is located in a zone where the trailing apex seal of the passing chambers also experiences a relatively low pressure differential but which increases in the direction of rotor rotation. Both plugs are fired at the same time by an ignition system that provides a predetermined relatively fast rise time spark ignition potential and an arc of predetermined relatively prolonged duration which is either substantially constant with respect to engine speed or varies inversely therewith and is determined according to the time available from start of ignition to when the trailing apex seal of the passing chambers reaches the trailing plug.

10 Claims, 6 Drawing Figures

ROTARY ENGINE COMBUSTION CONTROL ARRANGEMENT

This invention relates to a rotary engine combustion control arrangement and more particularly to the arrangement of spark plugs and their firing by an ignition system providing a predetermined fast rise time ignition spark potential and an arc of predetermined relatively prolonged duration.

According to the present invention, increased engine thermal efficiency, increased full throttle torque and power, improved cold weather startability, improved operation at lean and diluted air-fuel mixtures leaner than stoichiometric, and reduced spark fouling and other advantages are all made possible by a unique arrangement of leading and trailing spark plugs both of identical surface-gap design fired by an ignition system that provides a predetermined relatively fast rise time spark ignition potential and a sustained arc of predetermined relatively prolonged duration determined according to the time available from start of ignition to when the trailing apex seal of the passing chambers reaches the trailing plug. These spark plugs are mounted in the engine's rotor housing in peripherally spaced leading and trailing locations with the former located in a zone where the leading apex seal of the passing chambers experiences a relatively low pressure differential which decreases in the direction of rotor rotation and with the latter plug located in a zone where the trailing apex seal of the passing chambers also experiences a relatively low pressure differential but which increases in the direction of rotor rotation. The plugs are fired so as to have a relatively prolonged arc duration which is either substantially constant or varies inversely with respect to engine speed wherein in either event the arc always ceases before the trailing apex seal of the passing chambers reaches the trailing plug.

An object of the present invention is to provide a new and improved rotary engine combustion control arrangement.

Another object is to provide in a rotary engine combustion control arrangement a spark plug located in a zone where the trailing apex seal of the passing chambers experiences a relatively low pressure differential which increases in the direction of rotor rotation and wherein the plug is fired by an ignition system providing a predetermined relatively fast rise time spark ignition potential and an arc of predetermined relatively prolonged duration determined according to the time available from start of ignition to when the trailing apex seal of the passing chambers reaches the plug.

Another object is to provide in a rotary engine combustion control arrangement a spark plug located in a zone where the trailing apex seal of the passing chambers experiences a relatively low pressure differential which increases in the direction of rotor rotation and wherein the plug is fired by an ignition system providing a predetermined relatively fast rise time spark ignition potential and an arc of relatively prolonged duration which is either substantially constant with respect to engine speed or varies inversely therewith and is determined according to the time available from start of ignition to when the trailing apex seal of the passing chambers reaches the plug.

Another object is to provide in a rotary engine combustion control arrangement leading and trailing spark plugs wherein the leading plug is located in the inner peripheral wall of the engine's rotor housing in a zone where the leading apex seal of the passing chambers experiences a relatively low pressure differential which decreases in the direction of rotor rotation and wherein the trailing plug is located in a zone where the trailing apex seal of the passing chambers also experiences a relatively low pressure differential but which increases in the direction of rotor rotation and wherein both plugs are fired by an ignition system providing a predetermined relatively fast rise time spark ignition potential and an arc of relatively prolonged duration which is either substantially constant with respect to engine speed or varies inversely therewith and is determined according to the time available from start of ignition to when the trailing apex seal of the passing chambers reaches the trailing plug.

These and other objects of the present invention will be more apparent from the following description and drawing in which.

Figure 1:
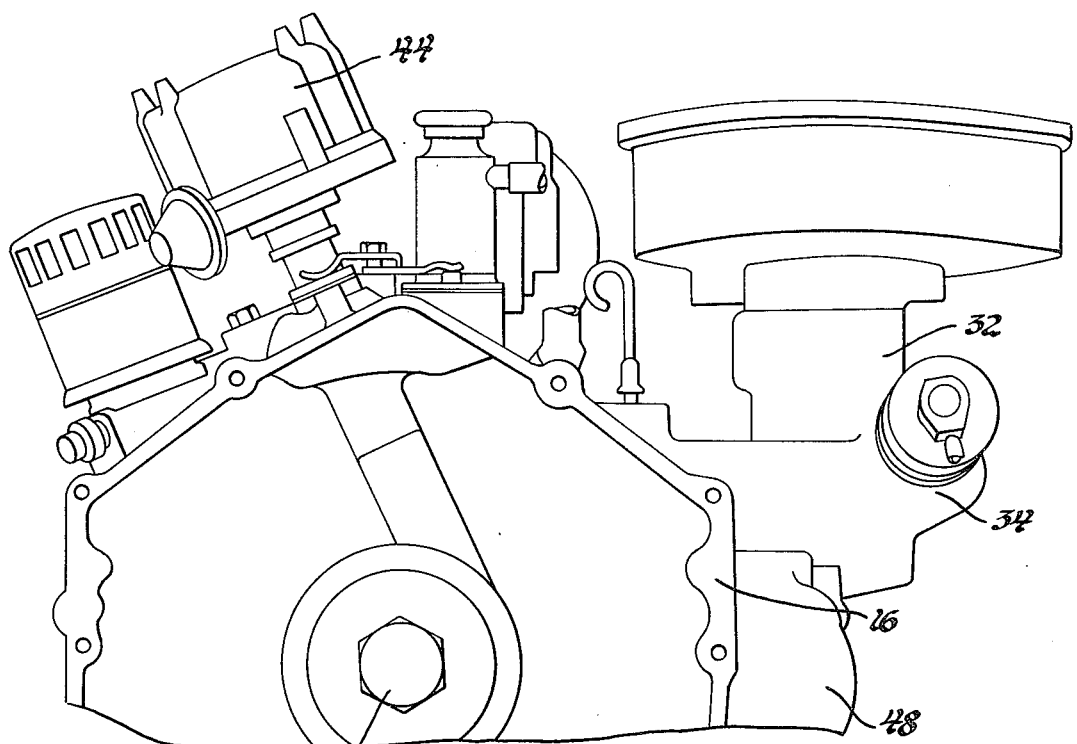
FIG. 1 is a partial end elevation of a rotary combustion engine having a combustion control arrangement according to the present invention.
Figure 2:
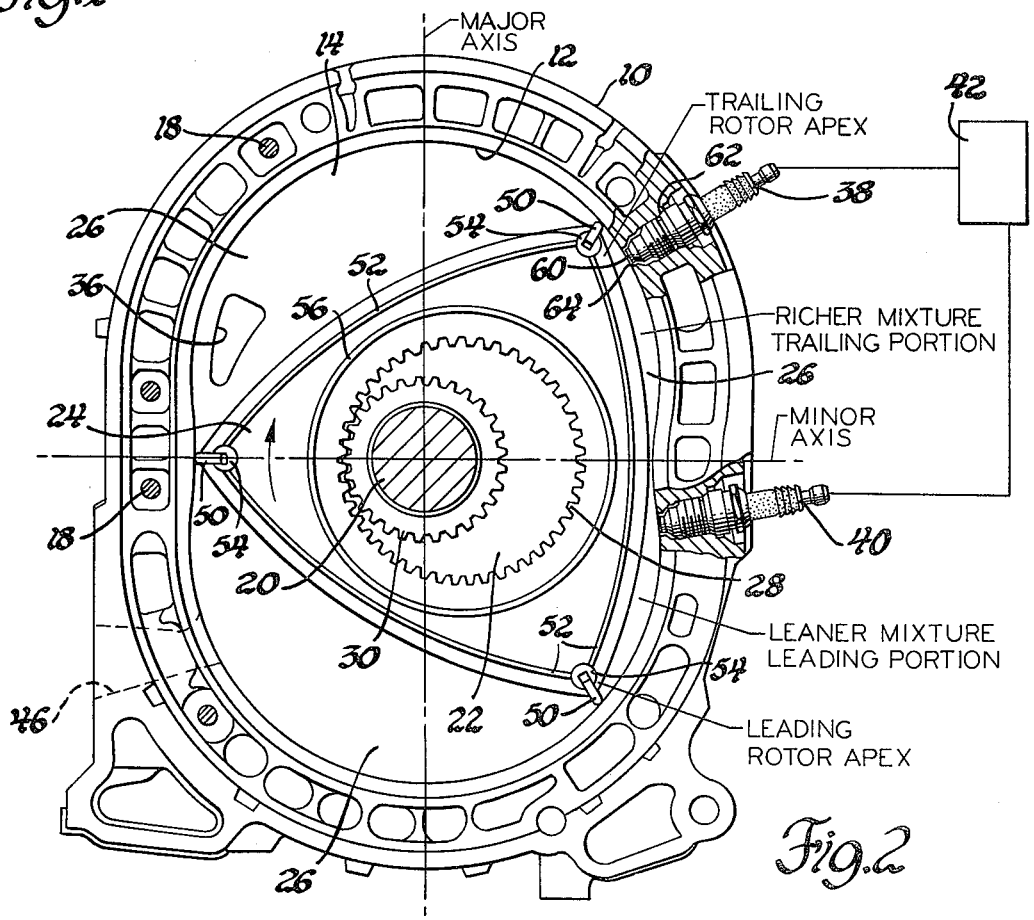
FIG. 2 is a view of the engine from the opposite end and with one of the end housings removed and parts in section to show the locations of the spark plugs in the combustion control arrangement according to the present invention.

Referring to FIGS. 1 and 2, the combustion control arrangement according to the present invention is for use in an internal combustion engine of the rotary type comprising one or more rotor housings 10 having an inwardly facing inner peripheral wall 12 and adjoining end and/or intermediate housings having parallel oppositely facing inner side walls 14, there being a rear end housing 16 shown in FIG. 1. The housings are secured together by bolts, 18, only some of which are shown, with the housing walls 12 and 14 cooperatively providing one or more cavities. A crankshaft 20 is rotatably supported in the engine housing and has an eccentric 22 in each cavity on which a rotor 24 is rotatably mounted. The inner peripheral wall 12 is outside of and parallels a two-lobe epitrochoid and the rotor 24 has the shape of a triangle with flanks that cooperate with the peripheral wall and also the side walls to define three variable volume working chambers 26 that are spaced about and move with the rotor as it rotates about the eccentric while the crankshaft turns. Each of the working chambers 26 is forced to sequentially expand and contract between minimum volume twice during each rotor revolution in fixed relation to the housing by forcing the rotor 24 to rotate at one-third the speed of the crankshaft 20. This is accomplished by gearing comprising an internal tooth gear 28 which is concentric and integral with one side of the rotor and meshes with an external tooth gear 30 which is received with clearance about and is concentric with the crankshaft 24 and is made stationary by being secured to an end housing. The rotary gear 28 has one and one-half times the number of teeth as the stationary gear 30 to provide the required speed ratio of 3:1 between the crankshaft and rotor.

A combustible air-fuel mixture from a carburetor 32 mounted on a manifold 34 secured to the engine housing is made available to the working chambers through oppositely facing intake ports 36 in the side walls 16 with the intake ports being located so that they are opened to the working chambers by the rotor as each chamber expands as the rotor rotates in the direction of the arrow in FIG. 2. Then as a charged chamber contracts the rotor 24 closes this chamber to the intake ports and the trapped fuel mixture is then compressed and when the rotor flank of this chamber is in the vicinity of top-deadcenter (TDC) which occurs when the center of this rotor flank aligns with the minor axis of the peripheral wall as shown in FIG. 2, the compressed mixture is ignited by both a trailing spark plug 38 and a leading spark plug 40 mounted in the rotor housing 10. The spark plugs are fired simultaneously by an ignition system 42 comprising a distributor 44 driven from the crankshaft 20 and upon ignition the peripheral wall takes the reaction forcing the rotor 24 to continue its forward motion while the gas is expanding. The leading rotor apex of each working chamber eventually traverses an exhaust port 46 in the peripheral wall 12 whereby the exhaust products are then exhausted to an exhaust manifold 48.

Sealing of the working chambers 26 for such four-cycle operation is provided by three apex seals 50 which are mounted at the rotor apexes and engage the peripheral wall 12, side seals 52 which are mounted in the rotor sides and engage the side walls 14 and corner seals 54 which are also mounted in the rotor sides and engage the side walls and provide sealing joints between the ends of the side seals and the apex seals. In addition, an oil seal 56 is mounted in each rotor side and engages the oppositely facing side wall to prevent the oil supplied for rotor cooling and bearing lubrication from reaching the radially outwardly located gas seals. contraction receiving trailing According to the present invention, it has been found that this engine's performance is substantially improved when (1) both the trailing and leading spark plugs 38 and 40 are of a particular single design; namely a surface-gap type, (2) the ignition system 42 is of the type providing (a) a very fast rate of voltage rise (short rise time) to thereby provide a satisfactory spark at the surface gap plugs and (b) a long or sustained spark duration and (3) the spark plugs are strategically arranged with respect to the long and narrow working chambers according to the ignition characteristics and the differential pressures across the leading and trailing rotor apexes of the chambers. Preferably, the surface-gap spark plugs 38 and 40 are of the type disclosed in U.S. Pat. No. 3,831,562 assigned to the assignee of this invention, these plugs possessing a minimum diameter at the tip 60 with a large annular spark gap and a series gap in the center electrode. The plugs having a conical seat 62 that seats on a corresponding accurately controlled conical surface in the spark plug hole in the rotor housing and thus eliminates the normal gasket seal to thereby provide an accurately controlled minimum recess of the spark plug tip below the peripheral wall 12. The small tip diameter permits a minimum size spark hole or ignition opening 64 in the peripheral wall 12 which in conjuction with the minimum tip recess results in very low gas blowby or leakage as an apex seal passes over the ignition opening. This surfacegap feature thus essentially fills up the spark plug opening for low gas blowby while simultaneously insuring that the ignition spark is produced consistently as near as possible to the peripheral wall.

Furthermore, the series gap in the center electrode helps to produce a very fast voltage rise at the spark gap which overcomes the fouling tendency of the combustion deposits or liquid fuel on the spark plug tip. In addition, the operating temperature of the spark plug varies greatly with its location in the peripheral wall which grows hotter in the leading direction and cooler in the trailing direction. Moreover, the time of exposure to flame increases rapidly as the spark plug is moved in the leading direction. Thus, the leading spark plug operates substantially hotter than the trailing spark plug. To meet these circumstances, the surface-gap plugs used are designed to operate at a tip temperature low enough to avoid pre-ignition at high power at the leading spark plug while, conversely, with the ignition system delivering very fast voltage rates of rise (or short rise times) along with prolonged spark burn duration, the same spark plug can also furnish an adequate igniting spark even at light loads and very low tip temperatures at extreme trailing locations. Thus, the single spark plug design of the surface-gap type can provide proper igniting spark at all operating conditions and at any spark plug location and is thus preferred. For a more detailed understanding of this particular plug, reference should be made to the aforementioned U.S. Pat. No. 3,831,562.

The ignition system 42 is of a type that is capable of firing both plugs simultaneously with a predetermined relatively fast rise time spark ignition potential and an arc of relatively prolonged duration which can be determined according to the time available from start of ignition to when the trailing apex seal of the passing chambers reaches the trailing spark plug. Furthermore, the arc duration may be substantially fixed or constant with respect to engine speed or vary inversely therewith for reasons which will become more apparent later. The prolonged spark duration has been found to be very important to the rotary engine because the air-fuel mixture moves with the rotor, being richer in the trailing portion and leaner in the leading portion (as shown in FIG. 2), and thus continually feeds a combustion mixture under the spark plug. Furthermore, the prolonged spark duration insures more consistent ignition of very lean mixtures. Ignition systems capable of producing the desired operation are disclosed in U.S. Pat. Nos. 3,824,977 and 3,945,362 which are both assigned to the assignee of this invention. In the ignition system in the aforementioned U.S. Pat. No. 3,824,977, the spark duration is substantially constant with respect to engine speed while in the ignition system in the aforementioned U.S. Pat. No. 3,945,362 the spark duration can be made to vary inversely with engine speed and these different characteristics are utilized to effect various improved results with our trailing spark plug location as will be disclosed in more detail later.

Figure 4:
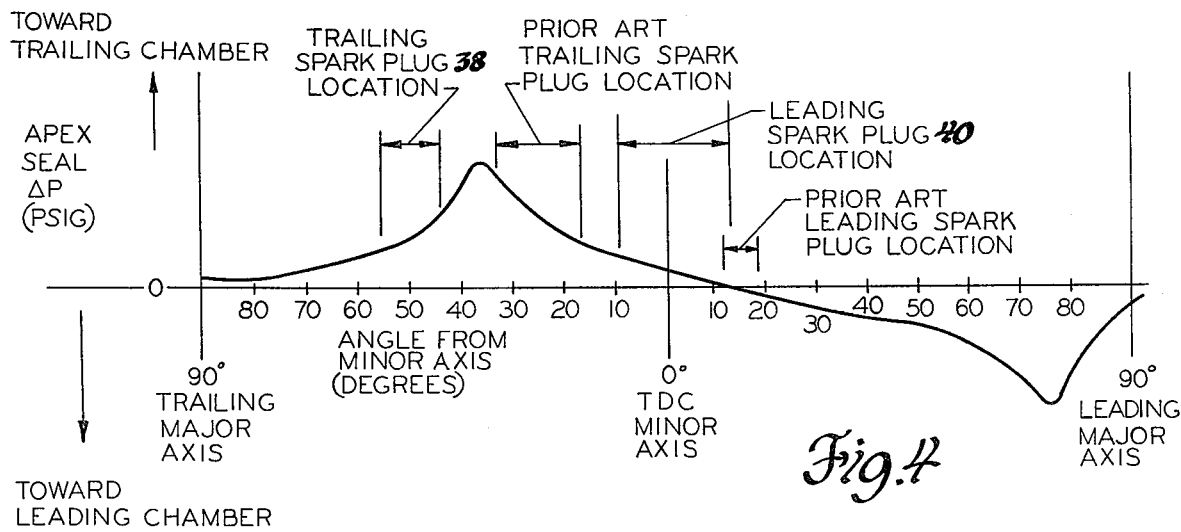

As to the location of the spark plugs, it was found that because of the inherent mixture stratification in the combustion chamber with the richer mixtures at the trailing end of the chambers and because combustion is faster in the direction of rotor movement, the trailing spark plug 38 is best located as close as possible to the trailing edge of the chamber in order to consistently ignite a lean mixture. Moreover, as the trailing spark plug ignition opening 64 is moved away from the minor axis closer to the trailing edge of the chamber, the pressure differential ($\Delta P$) toward the trailing chamber across the trailing rotor apex at this ignition opening reaches a maximum at about 35° measured in the trailing direction from the minor axis and then begins to diminish as shown in FIG. 4. Thus, once past this differential pressure peak the closer the trailing spark plug ignition opening is to the trailing edge of the chamber the smaller the differential pressure across the trailing rotor apex seal as it passes over this ignition opening and the lower the gas blowby to the trailing chamber. However, these two factors are balanced partially by the desire for the prolonged spark duration which was found to be possible in this combination if the spark plug ignition opening is located far enough away from the trailing rotor apex to permit the prolonged spark duration to expire just before the trailing rotor apex reaches this ignition opening. The present invention optimizes these several factors by locating the trailing spark plug ignition opening much further from the minor axis and closer to the trailing rotor apex as compared with known rotary engines. On the other hand, the leading spark plug is located near the minor axis or toward the leading edge of the chamber in a position in which the pressure differential toward the trailing chamber across the leading rotor apex seal is near zero as it crosses the spark plug ignition opening which occurs at about 10° measured in the leading direction from the minor axis as shown in FIG. 4. Thereafter, the pressure differential across the passing apex seals reverses toward the leading chamber as also shown in FIG. 4.

Figure 3:
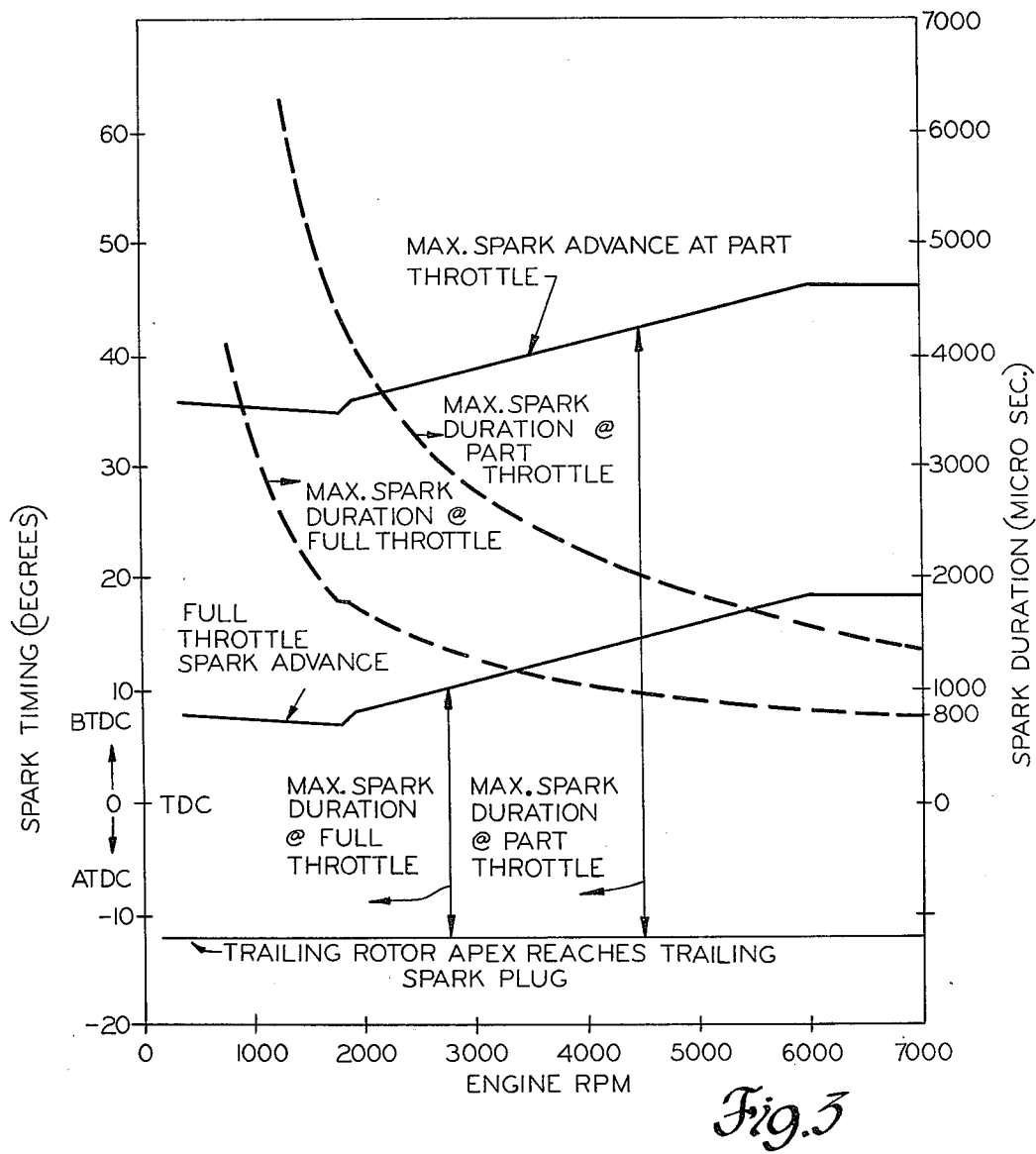
FIGS. 3, 4, 5 and 6 are graphs depicting certain typical actual operating characteristics of the present invention and how some of them depart or demonstrate an improvement relative to certain prior art.

Carrying our concept into the preferred embodiment shown, the maximum possible spark duration that can be used is determined according to the time interval between the controlled start of ignition and the instant the trailing rotor apex seal reaches the trailing spark plug opening and as shown in FIG. 3 this duration is shortest at full throttle operation and longest at part throttle operation when full vacuum advance is applied at the distributor. As also can be seen, the duration in real time in microseconds diminishes as speed is increased. When the ignition system 42 disclosed in the aforementioned U.S. Pat. No. 3,824,977 is used, the substantially constant spark duration it provides is determined by the full throttle spark timing at the highest operating speed for the particular trailing spark plug location. For example, in one actual arrangement according to the present invention the angular location of the trailing spark plug 38 was determined at 46° measured in the trailing direction from the minor axis where the trailing apex seal of the passing chambers experiences a relatively low pressure differential. In contrast, in the current production rotary engines that use a trailing spark plug, this plug is located much closer to the minor axis and in a zone where the trailing rotor apex seal experiences a substantially higher pressure differential which, however, is decreasing in the direction of rotor rotation, this latter zone being about 15°–33° from the minor axis as shown in FIG. 4. With the trailing spark plug located at 46° and the ignition system 42 providing a substantially constant spark duration relative to engine speed, the longest possible burn time occurs at full throttle spark timing at the highest operating speed and was found to be 800 microseconds in the actual construction as shown in FIG. 3. However, it will be appreciated that this Figure is dependent upon throttle spark advance and this minimum burn time could be greater with adjustment of the throttle spark advance. On the other hand, in some present production rotary engines the leading spark plug is located at about 10°–15° measured in the leading direction from the minor axis and in the present invention the leading spark plug 40 is similarly located or in a zone extending from about 10° measured in the leading direction from the minor axis to about 10° measured in the trailing direction toward the trailing edge of the chamber. Thus, the leading spark plug 40 is in a descending substantially low or balanced pressure differential zone across the leading rotor apex seal as it crosses this opening. When the ignition system 42 disclosed in the aforementioned U.S. Pat. No. 3,945,362 is used, the spark duration is made to vary inversely with engine speed. So now, for example, instead of being limited to the 800 microsecond burn time in the actual arrangement above mentioned, the burn time is extended to a very long burn time of 4100 microseconds for part throttle operation as shown in FIG. 3 to thus improve burning and therefore fuel economy in the range of engine operation where it is most desired. Furthermore, with the variable arc duration, the trailing spark plug can be moved even further in the direction of decreasing pressure differential experienced by the passing trailing apex seals because of less burn time being needed at higher speeds, it having been determined that the optimum trailing apex seal zone can be extended from 45° to about 55° from the minor axis as shown in FIG. 4.

Figure 5:
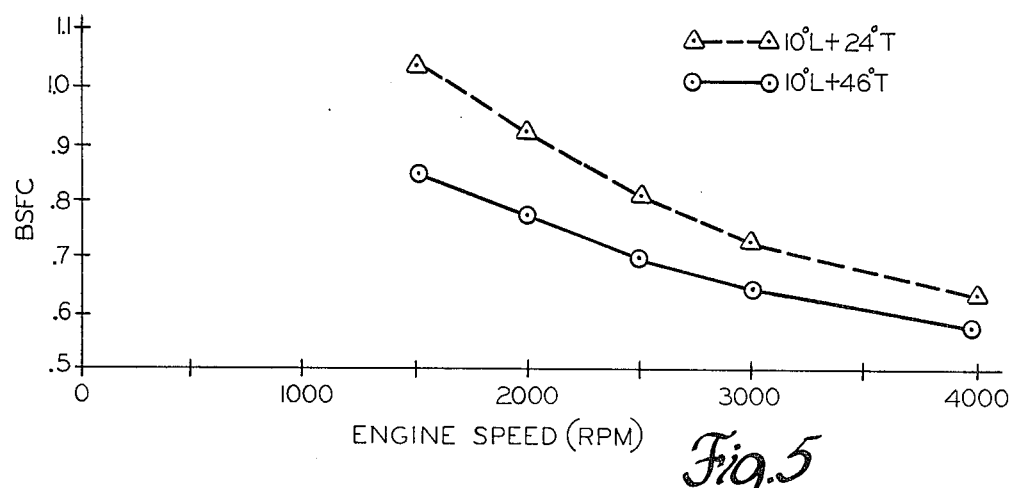
Figure 6:
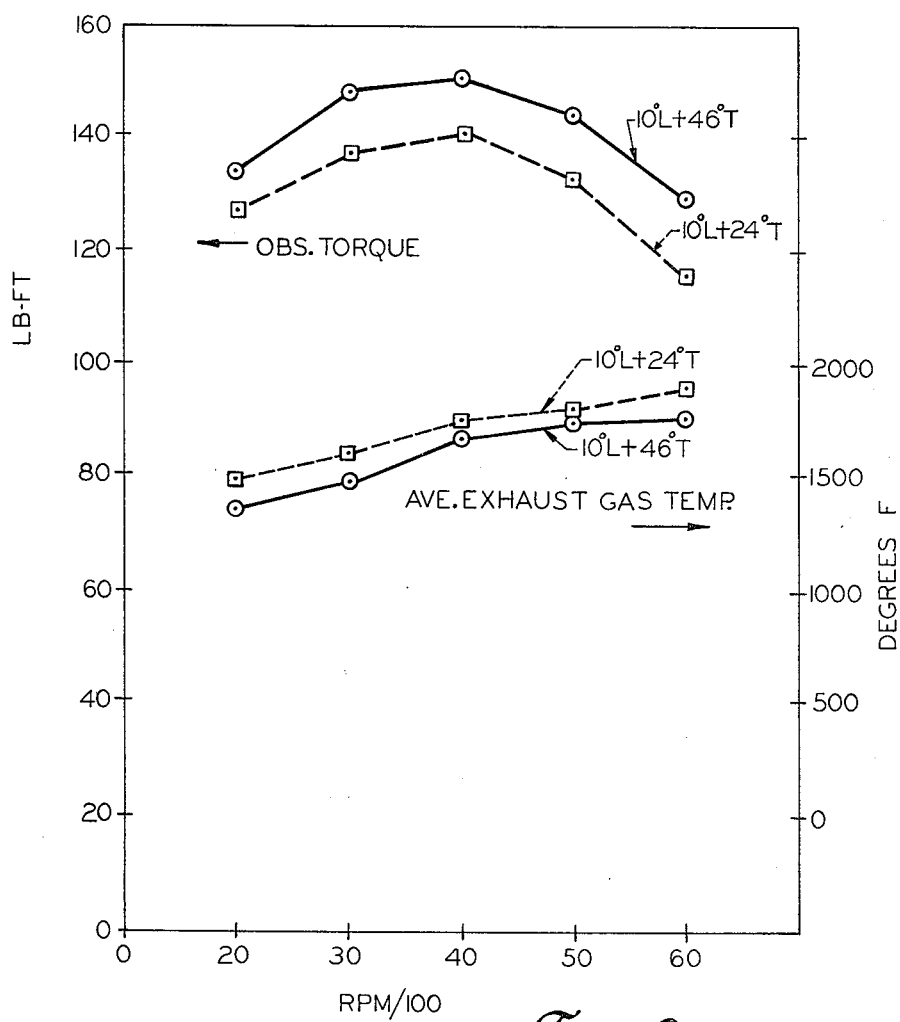

Comparisons between the combustion control arrangement according to the present invention with the trailing spark plug 38 at 46° to the trailing side (T) of the minor axis and the leading spark plug 40 at 10° to the leading side (L) of the minor axis and a relatively fixed spark duration of about 800 microseconds and with a conventional location of the trailing spark plug at 24° T while the leading spark plug remained at the same 10° L location is demonstrated in the graphs in FIGS. 5 and 6. In FIG. 5 it is seen that the brake specific fuel consumption (BSFC in LBS/HP-HR) has been substantially reduced by about 10–15% with this strategic trailing spark plug location while in FIG. 6 there is seen a substantial improvement in torque of about 10% over the entire speed range and a substantial reduction of about 100°–200° F in average exhaust temperature over the entire engine speed range and at all loads. Thus, there has been provided substantial improvement in both thermal efficiency and power output with the trailing spark plug location according to the present invention.

In the above described arrangement, the ignition system fires both plugs at the same time; however, it will be appreciated that so far as firing sequence is concerned, the ignition system could also be selected to provide a time delay between firing the trailing and leading plugs and also cutting out firing of either plug under certain engine operating conditions.

The above described embodiments are illustrative of the invention which may be modified within the scope of the appended claims.

We claim:
1. A rotary internal combustion engine comprising housing means having an inner peripheral wall and oppositely facing side walls, a rotor rotatably mounted in said housing means between said side walls with apexes that remain adjacent said peripheral wall as said rotor rotates, said rotor and said walls cooperatively defining a plurality of chambers spaced around said rotor between leading and trailing apexes that expand and contract while moving with said rotor, an apex seal mounted on each said rotor apex for engaging said inner peripheral wall to provide sealing between adjacent chambers, said housing means having an intake port for delivering a combustible mixture to said chambers as they expand in an intake phase prior to their contraction in a compression phase, said housing means having an exhaust port for receiving exhaust gases from said chambers as they contract in an exhaust phase following their expansion in a power phase, a spark plug mounted on said housing means with its spark electrode located in an ignition opening in said peripheral wall so as to be exposed to a trailing portion of the passing chambers at the beginning of their power phase, said ignition opening further being located in a zone where the trailing apex seal of the passing chambers experiences a pressure differential which increases in the direction of rotor rotation and is substantially below the peak pressure differential reached and an ignition system providing said spark plug with an arc of prolonged duration approximating the time available from start of ignition to when the trailing apex seal of the passing chambers reaches the ignition opening.

2. A rotary internal combustion engine comprising housing means having an inner peripheral wall and oppositely facing side walls, a rotor rotatably mounted in said housing means between said side walls with apexes that remain adjacent said peripheral wall as said rotor rotates, said rotor and said walls cooperatively defining a plurality of chambers spaced around said rotor between leading and trailing apexes that expand and contract while moving with said rotor, an apex seal mounted on each said rotor apex for engaging said inner peripheral wall to provide sealing between adjacent chambers, said housing means having an intake port for delivering a combustible mixture to said chambers as they expand in an intake phase prior to their contraction in a compression phase, said housing means having an exhuast port for receiving exhaust gases from said chambers as they contract in an exhaust phase following their expansion in a power phase, a spark plug mounted on said housing means with its spark electrode located in an ignition opening in said peripheral wall so as to be exposed to a trailing portion of the passing chambers at the beginning of their power phase, said ignition opening further being located in a zone where the trailing apex seal of the passing chambers experiences a pressure differential which increases in the direction of rotor rotation and is substantially below the peak pressure differential reached and an ignition system providing said peak plug with an arc of prolonged duration that is substantially constant relative to engine speed and approximates the shortest time available from start of ignition to when the trailing apex seal of the passing chambers reaches the ignition opening.

3. A rotary internal combustion engine comprising housing means having an inner peripheral wall and oppositely facing side walls, a rotor rotatably mounted in said housing means between said side walls with apexes that remain adjacent said peripheral wall as said rotor rotates, said rotor and said walls cooperatively defining a plurality of chambers spaced around said rotor between leading and trailing apexes that expand and contract while moving with said rotor, an apex seal mounted on each said rotor apex for engaging said inner peripheral wall to provide sealing between adjacent chambers, said housing means having an intake port for delivering a combustible mixture to said chambers as they expand in an intake phase prior to their contraction in a compression phase, said housing means having an exhaust port for receiving exhaust gases from said chambers as they contract in an exhaust phase following their expansion in a power phase, a surface-gap spark plug mounted on said housing means with its spark electrode located in an ignition opening in said peripheral wall so as to be exposed to a trailing portion of the passing chambers at the beginning of their power phase, said ignition opening further being located in a zone where the trailing apex seal of the passing chambers experiences a pressure differential which increases in the direction of rotor rotation and is substantially below the peak pressure differential reached and an ignition system providing said spark plug with an arc of prolonged duration that is substantially constant relative to engine speed and approximates the shortest time available from start of ignition to when the trailing apex seal of the passing chambers reaches the ignition opening.

4. A rotary internal combustion engine comprising housing means having an inner peripheral wall and oppositely facing side walls, a rotor rotatably mounted in said housing means between said side walls with apexes that remain adjacent said peripheral wall as said rotor rotates, said rotor and said walls cooperatively defining a plurality of chambers spaced around said rotor between leading and trailing apexes that expand and contract while moving with said rotor, an apex seal mounted on each said rotor apex for engaging said inner peripheral wall to provide sealing between adjacent chambers, said housing means having an intake port for delivering a combustible mixture to said chambers as they expand in an intake phase prior to their contraction in a compression phase, said housing means having an exhaust port for receiving exhaust gases from said chambers as they contract in an exhaust phase following their expansion in a power phase, a spark plug mounted on said housing means with its spark electrode located in an ignition opening in said peripheral wall so as to be exposed to a trailing portion of the passing chambers at the beginning of their power phase, said ignition opening further being located in a zone where the trailing apex seal of the passing chambers experiences a pressure differential which increases in the direction of rotor rotation and is substantially below the peak pressure differential reached and an ignition system providing said spark plug with an arc of prolonged duration that varies inversely with engine speed and is determined to approximate the time available from start of ignition to when the trailing apex seal of the passing chambers reaches the ignition opening.

5. A rotary internal combustion engine comprising housing means having an inner peripheral wall and oppositely facing side walls, a rotor rotatably mounted in said housing means between said side walls with apexes that remain adjacent said peripheral wall as said rotor rotates, said rotor and said walls cooperatively defining a plurality of chambers spaced around said rotor between leading and trailing apexes that expand and contract while moving with said rotor, an apex seal mounted on each said rotor apex for engaging said inner peripheral wall to provide sealing between adjacent chambers, said housing means having an intake port for delivering a combustible mixture to said chambers as they expand in an intake phase prior to their contraction in a compression phase, said housing means having an exhaust port for receiving exhaust gases from said chambers as they contract in an exhaust phase following their expansion in a power phase, a surface-gap spark plug mounted on said housing means with its spark electrode located in an ignition opening in said peripheral wall so as to be exposed to a trailing portion of the passing chambers at the beginning of their power phase, said ignition opening further being located in a zone where the trailing apex seal of the passing chambers experiences a pressure differential which increases in the direction of rotor rotation and is substantially below the peak pressure differential reached and an ignition system providing said spark plug with an arc of prolonged duration that varies inversely with engine speed and is determined to approximate the time available from start of ignition to when the trailing apex seal of the passing chambers reaches the ignition opening.

6. A rotary internal combustion engine comprising housing means having an inner peripheral wall and oppositely facing side walls, a rotor rotatably mounted in said housing means between said side walls with apexes that remain adjacent said peripheral wall as said rotor rotates, said rotor and said walls cooperatively defining a plurality of chambers spaced around said rotor between leading and trailing apexes that expand and contract while moving with said rotor, an apex seal mounted on each said rotor apex for engaging said inner peripheral wall to provide sealing between adjacent chambers, said housing means having an intake port for delivering a combustible mixture to said chambers as they expand in an intake phase prior to their contraction in a compression phase, said housing means having an exhaust port for receiving exhaust gases from said chambers as they contract in an exhaust phase following their expansion in a power phase, leading the trailing spark plugs mounted on said housing means with their respective spark electrodes located in peripherally spaced leading and trailing ignition openings in said peripheral wall so as to be simultaneously exposed to leading and trailing portions of the passing chambers at the beginning of their power phase, said leading ignition further being located in a zone ahead of about 10° after top-dead-center where the leading apex seal of the passing chambers experiences a pressure differential which decreases in the direction of rotor rotation, said trailing ignition opening further being located in a zone ahead of about 35° before top-dead-center where the trailing apex seal of the passing chambers experiences a pressure differential which increases in the direction of rotor rotation, and an ignition system for providing both said spark plugs with an arc of prolonged duration determined to approximate the time interval between the start of ignition and when the trailing apex seal of the passing chambers reaches said trailing ignition opening.

7. A rotary internal combustion engine comprising housing means having an inner peripheral wall and oppositely facing side walls, a rotor rotatably mounted in said housing means between said side walls with apexes that remain adjacent said peripheral wall as said rotor rotates, said rotor and said walls cooperatively defining a plurality of chambers spaced around said rotor between leading and trailing apexes that expand and contract while moving with said rotor, and apex seal mounted on each said rotor apex for engaging said inner peripheral wall to provide sealing between adjacent chambers, said housing means having an intake port for delivering a combustible mixture to said chambers as they expand in an intake phase prior to their conraction is a compression phase, said housing means having an exhaust port for receivng exhaust gases from said chambers as they contract in an exhaust phase following their expansion in a power phase, leading and traling spark plugs mounted on said housing means with their respective spark electrodes located in peripherally spaced leading and trailing ignition openings in said peripheral wall so as to be simultaneously exposed to leading and trailing portions of the passing chambers at the beginning of their power phase, said trailing ignition opening further being located in a zone ahead of about 35° before top-dead-center where the trailing apex seal of the passing chambers experiences a pressure differential which increases in the direction of rotor rotation, and an ignition system for providing both said spark plugs with an arc of prolonged duration that is substantially constant relative to engine speed and approximates the shortest time interval between the start of ignition and when the trailing apex seal of the passing chambers reaches said trailing ignition opening.

8. A rotary internal combustion engine comprising housing means having an inner peripheral wall and oppositely facing side walls, a rotor rotatably mounted in said housing means between said walls with apexes that remain adjacent said peripheral wall as said rotor rotates, said rotor and said walls cooperatively defining a plurality of chambers spaced around said rotor between leading and trailing apexes that expand and contract while moving with said rotor, an apex seal mounted on each said rotor apex for engaging said inner peripheral wall to provide sealing between adjacent chambers, said housing means having an intake port for delivering a combustible mixture to said chambers as they expand in an intake phase prior to their contraction in a compression phase, said housing means having an exhaust port for receiving exhaust gases from said chambers as they contract in an exhaust phase following their expansion in a power phase, leading and trailing surface-gap spark plugs mounted on said housing means with their respective spark electrodes located in peripherally spaced leading and trailing ignition openings in said peripheral wall so as to be simultaneously exposed to leading and trailing portions of the passing chambers at the beginning of their power phase, said leading ignition opening further being located in a zone about 10° before to 15° after top-dead-center where the leading apex seal of the passing chambers experiences a pressure differential which decreases in the direction of rotor rotation, said trailing ignition opening further being located in a zone ahead of about 35° before top-dead-center where the trailing apex seal of the passing chambers experiences a pressure differential which increases in the direction of rotor rotation, and an ignition system for providing both said spark plugs with an arc of prolonged duration that is substantially constant relative to engine speed and approximates the shortest time interval between the start of ignition and when the trailing apex seal of the passing chambers reaches said trailing ignition opening.

9. A rotary internal combustion engine comprising housing means having an inner peripheral wall and oppositely facing side walls, a rotor rotatably mounted in said housing means between said side walls with apexes that remain adjacent said peripheral wall as said rotor rotates, said rotor and said walls cooperatively defining a plurality of chambers spaced around said rotor between leading and trailing apexes that expand and contract while moving with said rotor, an apex seal mounted on each said rotor apex for engaging said inner peripheral wall to provide sealing between adjacent chambers, said housing means having an intake port for delivering a combustible mixture to said chambers as they expand in an intake phase prior to their contraction in a compression phase, said housing means having an exhaust port for receiving exhaust gases from said chambers as they contract in an exhaust phase following their expansion in a power phase, leading and trailing spark plugs mounted on said housing means with their respective spark electrodes located in peripherally spaced leading and trailing ignition openings in said peripheral wall so as to be simultaneously exposed to leading and trailing portions of the passing chambers at the beginning of their power phase, said trailing ignition opening being further located in a zone about 45° to 55° before top-dead-center where the trailing apex seal of the passing chambers experiences a pressure differential which increases in the direction of rotor rotation, and an ignition system for providing both said spark plugs with an arc of prolonged duration that varies inversely with engine speed and is determined to approximate time interval between the start of ignition and when the trailing apex seal of the passing chambers reaches said trailing ignition opening.

10. A rotary internal combustion engine comprising housing means having an inner peripheral wall and oppositely facing side walls, a rotor rotatably mounted in said housing means between said side walls with apexes that remain adjacent said peripheral wall as said rotor rotates, said rotor and said walls cooperatively defining a plurality of chambers spaced around said rotor between leading and trailing apexes that expand and contract while moving with said rotor, an apex seal mounted on each said rotor apex for engaging said inner peripheral wall to provide sealing between adjacent chambers, said housing means having an intake port for delivering a combustible mixture to said chambers as they expand in an intake phase prior to their contraction in a compression phase, said housing means having an exhaust port for receiving exhaust gases from said chambers as they contract in an exhaust phase following their expansion in a power phase, leadng and trailing surface-gap spark plugs mounted on said housing means with their respective spark electrodes located in peripherally spaced leading and trailing ignition openings in said peripheral wall so as to be simultaneously exposed to leading and trailing portions of the passing chambers at the beginning of their power phase, said leading ignition opening further being located in a zone about 10° before to 15° after top-dead-center where the leading apex seal of the passing chambers experiences a pressure differential which decreases in the direction of rotor rotation, said trailing ignition opening further being located in a zone about 45° to 55° before top-dead-center where the trailing apex seal of the passing chambers experiences a pressure differential which increases in the direction of rotor rotation, and an ignition system for providing both said spark plugs with an arc of prolonged duration that varies inversely with engine speed and is determined to approximate the shortest time interval between the start of ignition and when the trailing apex seal of the passing chambers reaches said trailing ignition opening.

* * * * *

UNITED STATES PATENT AND TRADEMARK OFFICE
CERTIFICATE OF CORRECTION

PATENT NO. : 4,014,297
DATED : March 29, 1977
INVENTOR(S) : Edward A. Rishavy, James H. Currie It is certified that error appears in the above-identified patent and that said Letters Patent are hereby corrected as shown below:

Column 3, line 35, delete "contraction receiving trailing".
Column 7, line 49, "peak" should read -- spark --.
Column 9, line 35, "the" should read -- and --; line 63, "and", second occurrence, should read -- an --.

Signed and Sealed this

Fourteenth Day of June 1977

[SEAL]

Attest:

RUTH C. MASON
*Attesting Officer*

C. MARSHALL DANN
*Commissioner of Patents and Trademarks*